US009378183B2

(12) United States Patent
Tamaki

(10) Patent No.: US 9,378,183 B2
(45) Date of Patent: Jun. 28, 2016

(54) MONITORING DIAGNOSTIC DEVICE AND MONITORING DIAGNOSTIC METHOD

(75) Inventor: Kenji Tamaki, Kawasaki (JP)

(73) Assignee: HITACHI, LTD., Tokyo (JP)

(*) Notice: Subject to any disclaimer, the term of this patent is extended or adjusted under 35 U.S.C. 154(b) by 891 days.

(21) Appl. No.: 13/699,018

(22) PCT Filed: May 11, 2011

(86) PCT No.: PCT/JP2011/060839
§ 371 (c)(1),
(2), (4) Date: Dec. 12, 2012

(87) PCT Pub. No.: WO2011/145496
PCT Pub. Date: Nov. 24, 2011

(65) Prior Publication Data

US 2013/0132000 A1 May 23, 2013

(30) Foreign Application Priority Data

May 20, 2010 (JP) ................................ 2010-116606

(51) Int. Cl.
*G01B 5/28* (2006.01)
*G06F 17/00* (2006.01)
*G05B 23/02* (2006.01)
*G01M 13/00* (2006.01)

(52) U.S. Cl.
CPC ............... *G06F 17/00* (2013.01); *G01M 13/00* (2013.01); *G05B 23/0224* (2013.01); *G05B 23/0281* (2013.01)

(58) Field of Classification Search
None
See application file for complete search history.

(56) References Cited

U.S. PATENT DOCUMENTS 7,209,846 B2 * 4/2007 Tamaki .................. G06Q 10/06 700/109
2006/0047454 A1 3/2006 Tamaki et al.
2008/0083010 A1 * 4/2008 Koehler ................ H04L 63/102 726/1
2011/0276828 A1 11/2011 Tamaki et al.
2012/0136629 A1 5/2012 Tamaki et al.
2012/0185728 A1 * 7/2012 Guo .................... F24F 11/0009 714/26

FOREIGN PATENT DOCUMENTS

JP 05-256741 10/1993
JP 06-004789 1/1994
JP 2000-311012 11/2000

(Continued)

OTHER PUBLICATIONS

International Search Report for International Application No. PCT/JP2011/060839, filed on May 11, 2011.

(Continued)

*Primary Examiner* — Aditya Bhat
(74) *Attorney, Agent, or Firm* — Baker Botts L.L.P.

(57) ABSTRACT

An abnormality monitoring process milt (2) divides sensor data collected from a monitoring-target apparatus (8) into sensor data for each of a plurality of condition modes based on a condition-mode transition point detected by a condition-mode transition point detecting process unit (21), and sorts the divided sensor data into a plurality of groups. Next, for each condition mode and each group, each piece of sensor data is compared with past statistic data, thereby detecting an abnormality. A causal diagnosis process unit (3) diagnoses an abnormality cause using link models before and after an abnormality is detected built based on a correlation coefficient between two pieces of sensor data in each group.

8 Claims, 12 Drawing Sheets

(56) References Cited

FOREIGN PATENT DOCUMENTS

| | | |
|---|---|---|
| JP | 2005-165375 | 6/2005 |
| JP | 2006-65598 | 3/2006 |
| JP | 2010-287011 | 12/2010 |
| WO | WO 2010/082322 | 7/2010 |

OTHER PUBLICATIONS

Christopher M. Bishop "Pattern Recognition and Machine Learning", USA, Springer, 2006, Chapter 8 (Graphical Models), ISBN 978-0387310732.

* cited by examiner

FIG.5A

"RAW" SENSOR DATA

| | TIME | SS11 | CONDITION FLAG |
|---|---|---|---|
| | 0 | d(0) | STANDSTILL |
| | 1 | d(1) | STANDSTILL |
| | 2 | d(2) | STANDSTILL |
| | ... | ... | ... |
| t1 | 100 | d(100) | ACTIVATION |
| | 101 | d(101) | ACTIVATION |
| | 102 | d(102) | ACTIVATION |
| | ... | ... | ... |
| t2 | 110 | d(110) | OPERATION |
| | 111 | d(111) | OPERATION |
| | 112 | d(112) | OPERATION |
| | ... | ... | ... |
| t3 | 500 | d(500) | DEACTIVATION |
| | 501 | d(501) | DEACTIVATION |
| | 502 | d(502) | DEACTIVATION |
| | ... | ... | ... |
| t4 | 520 | d(520) | STANDSTILL |
| | 521 | d(521) | STANDSTILL |
| | ... | ... | ... |

FIG.5B

CONDITION-MODE-BY-CONDITION-MODE SENSOR DATA

ACTIVATION DATA

| TIME | SS11 |
|---|---|
| 100 | d(100) |
| 101 | d(101) |
| 102 | d(102) |
| ... | ... |

OPERATION DATA

| TIME | SS11 |
|---|---|
| 110 | d(110) |
| 111 | d(111) |
| 112 | d(112) |
| ... | ... |

DEACTIVATION DATA

| TIME | SS11 |
|---|---|
| 500 | d(500) |
| 501 | d(501) |
| 502 | d(502) |
| ... | ... |

<NOTE>
t1: STARTING SEQUENCE START POINT
t2: STARTING SEQUENCE END POINT
t3: DEACTIVATION SEQUENCE START POINT
t4: DEACTIVATION SEQUENCE END POINT

FIG.8A

CONDITION-MODE-BY-CONDITION-MODE SENSOR DATA (ACTIVATION DATA)

| TIME | SS11 |
|---|---|
| 100 | d(100) |
| 101 | d(101) |
| 102 | d(102) |
| ... | ... |

TRANSIENT-CONDITION MULTIVARIABLE DATA (GROUP-G1 ACTIVATION DATA)

| TIME | SS11 | SS12 | SS13 |
|---|---|---|---|
| 1 | d(100) | e(100) | f(100) |
| 2 | d(101) | e(101) | f(101) |
| 3 | d(102) | e(102) | f(102) |
| ... | ... | ... | ... |

FIG.8B

CONDITION-MODE-BY-CONDITION-MODE SENSOR DATA (DEACTIVATION DATA)

| TIME | SS11 |
|---|---|
| 500 | d(500) |
| 501 | d(501) |
| 502 | d(502) |
| ... | ... |

TRANSIENT-CONDITION MULTIVARIABLE DATA (GROUP-G1 DEACTIVATION DATA)

| TIME | SS11 | SS12 | SS13 |
|---|---|---|---|
| 1 | d(500) | e(500) | f(500) |
| 2 | d(501) | e(501) | f(501) |
| 3 | d(502) | e(502) | f(502) |
| ... | ... | ... | ... |

FIG.8C

CONDITION-MODE-BY-CONDITION-MODE SENSOR DATA (OPERATION DATA)

| TIME | SS11 |
|---|---|
| 110 | d(110) |
| 111 | d(111) |
| 112 | d(112) |
| ... | ... |

STEADY-CONDITION MULTIVARIABLE DATA (GROUP-G1 OPERATION DATA)

| TIME | SS11 | SS12 | SS13 |
|---|---|---|---|
| 1 | d(110) | e(110) | f(110) |
| 2 | d(111) | e(111) | f(111) |
| 3 | d(112) | e(112) | f(112) |
| ... | ... | ... | ... |

SS11~13, SS21~23, SS31~33: TRANSIENT

SS11～13, SS21～23, SS31～33:TRANSIENT

SS11～13, SS21～23, SS31～33:TRANSIENT

MONITORING DIAGNOSTIC DEVICE AND MONITORING DIAGNOSTIC METHOD

CROSS REFERENCE TO RELATED APPLICATIONS

This application claims priority to PCT Appliction No. PCT/JP2011/060839, filed on May 11, 2011, which claims priority to Japanese Application No. JP2010116606, filed on May 20, 2010, each of which are hereby incorporated by reference.

TECHNICAL FIELD

The present invention relates to a monitoring diagnostic device and a monitoring diagnostic method which monitor an abnormal operation of an apparatus including a plurality of components, and which diagnose a cause of such an abnormal operation.

BACKGROUND ART

In the cases of energy converting apparatuses (facilities) represented by combined heat and power (cogeneration) apparatuses that convert a fuel into at least kinetic energy, thermal energy, or electric energy, in order to measure the condition of such an apparatus, a technology of a Condition Based Maintenance (CBM) is known which installs a plurality of sensors (measuring instruments), measures and grasps the condition of the apparatus from time to time through those sensors, determines the normal or abnormal condition of the apparatus based on the measured data (referred to as apparatus condition measured data or sensor data, etc.), and carries out a maintenance in view of the abnormal condition.

In order to carry out the condition based maintenance (CBM) effectively, it is necessary to find a sign of an abnormality before the apparatus breaks down. An effective method to find a sign of an abnormality is to statistically analyze pieces of data of the plurality of condition measuring sensors, to obtain reference data from the condition measuring sensor when an apparatus is in a normal condition, and to check data measured from time to time with the reference.

In the cases of energy converting apparatuses, most modules constructing the apparatus and components constructing the module are operated in association with each other to let the apparatus to accomplish the object like energy conversion. Hence, most outputs by the plurality of sensors installed for the plurality of components, etc., constructing the apparatus change in association with each other. Accordingly, if the relationship among respective sensor outputs that change in association with each other in the normal condition is compared with the relationship among respective sensor outputs that change in association with each other in the abnormal condition to create a model, it becomes possible to diagnose a cause of an abnormality (a defect) after the abnormal condition has been detected.

For example, Patent Literatures 1 and 2 disclose a method of analyzing a causal association between a product quality in a production line and process data through a graphical model, which is not an example of the condition based maintenance (CBM) of an apparatus, though. Moreover, Non-patent Literature 1 discloses a typical statistical and mathematical algorithm method of analyzing a causal association through a graphical model.

PRIOR ART DOCUMENTS

Patent Literatures

Patent Literature 1: JP 2006-65598 A

Patent Literature 2: U.S. Pat. No. 7,209,846 (U.S. Pat. No. 7,209,846 B2), specification

Non-patent Literature

Non-patent Literature 1: Christopher M. Bishop, “Pattern Recognition and Machine Learning”, USA, Springer, 2006, Chapter 8 (Graphical Models), ISBN 978-0387310732

DISCLOSURE OF INVENTION

Problem to be Solved by the Invention

The conventional condition based maintenance (CBM) technology and the technology disclosed in Patent Literature 1 do not address the following disadvantages.

(First Disadvantage: Correspondence to Change in Apparatus Condition)

In general, the condition of an apparatus changes due to other factors than a defect. Such an apparatus includes, in addition to an apparatus which continuously performs a steady operation, one which repeats an operation cycle of a start, a steady operation, and a stop in accordance with the operation of a factory or a shop. According to the cycle operation apparatus, the condition change occurs at transient conditions, such as a start and a stop. Moreover, in the case of the continuous steady operation apparatus, it is stopped at the time of a regular maintenance, and is started after the maintenance, and thus a condition change occurs. The conventional technologies recognize such condition changes and report as an abnormality (an abnormality sign), i.e., a false report is informed.

When, in particular, in the steady condition during the continuous steady operation, a feedback control is carried out to suppress an effect of a disturbance acting on an apparatus, and it is necessary to monitor whether or not a controller, an actuator, and a sensor constructing a control system operate normally. Hence, a condition change in the steady condition is suppressed to be a sufficiently smaller value than that of a condition change in the transient condition through the control. Accordingly, if a determination reference for precisely monitoring the steady condition is applied to a monitoring of the transient condition, the condition change in the transient condition is detected and a false report is immediately informed. As explained above, the conventional technologies have no correspondence technology at all to cope with the information of a false report.

(Second Disadvantage: Cause Diagnosis)

When an abnormal condition is detected, it is necessary to diagnose the cause of the abnormal condition. In this case, when the number of items of measured data (the number of installed sensors) subjected to a diagnosis increases, the precision of the cause diagnosis decreases or it takes a long time for diagnosing the cause. In particular, in the cases of energy converting apparatuses, pieces of measured data on most components constructing such an apparatus change in association with each other for the purpose of an energy conversion, and thus it becomes difficult to analyze the association relationship therebetween. Hence, the larger the number of items of data is, the more it becomes difficult to narrow down the true cause among those items.

When, in particular, a cause diagnosis through a graphical model disclosed in Non-patent Literature 1 is performed, an inverse matrix calculation becomes necessary but if the number of items of data that change in association with each other is included, the inverse matrix calculation becomes unstable. Moreover, when the narrow-down of the cause is insufficient, when a cause diagnosis result of a large-scale apparatus is presented to a maintenance worker, it becomes difficult for the maintenance worker to examine the content of the presentation.

The present invention has been made in view of the disadvantages of the conventional technologies, and it is an object of the present invention to provide a monitoring diagnostic device and a monitoring diagnostic method which can improve the precision of an abnormality detection and which can efficiently estimate the cause of an abnormality.

Means for Solving the Problem

A monitoring diagnostic device according to the present invention includes: a first process unit that collects, from a monitoring-target apparatus comprising a plurality of components, a time-series physical quantity (sensor data in the embodiment, the same is true of the following explanation) indicating a time transition in a physical condition of each of the plurality of components; a second process unit (the abnormality monitoring process unit in the embodiment, the same is true of the following explanation) that detects an abnormality in the monitoring-target apparatus using the time-series physical quantities of the plurality of components collected by the first process unit; and a third process unit (the causal diagnosis process unit in the embodiment, the same is true of the following explanation) that diagnoses a cause of the abnormality, the second process unit being configured to execute: a data-item group sorting process of sorting data items identifying the time-series physical quantities of the plurality of components into a plurality of groups; and an abnormality determining process (the transient-condition abnormality determining process and the steady-condition abnormality determining process in the embodiment) of determining an abnormality for each sorted group based on the time-series physical quantity of the component identified by the data item belonging to that group and statistical data on the time-series physical quantity of the component, and the third process unit being configured to execute: a link-model building process of building, for each sorted group, a link model including an inter-data-item link model representing a dependency relation between the time-series physical quantities of the components identified by the data item belonging to that group, and an inter-group link model representing a dependency relation between representative values of the groups; and an abnormality cause estimating process of estimating a cause of the abnormality based on a difference link model (the abnormality difference link model in the embodiment) between a link model built based on the time-series physical quantity of the component before the abnormality is detected through the abnormality determining process and a link model built based on the time-series physical quantity of the component when the abnormality is detected through the abnormality determining process.

According to the monitoring diagnostic device of the present invention, the second process unit further executes: a condition-mode transition point detecting process of detecting, for each time-series physical quantity of each of the plurality of components, a transition point of a condition mode of that time-series physical quantity; and a condition-mode-by-condition-mode time-series physical quantity extracting process of dividing the time-series physical quantity of the component by each condition mode based on the detected transition point, and of extracting each divided time-series physical quantity of the component as a time-series physical quantity in a condition mode by condition mode manner.

Effect of the Invention

According to the present invention, it becomes possible to provide a monitoring diagnostic device and a monitoring diagnostic method which can improve the precision of an abnormality detection and which can efficiently estimate the cause of an abnormality.

BRIEF DESCRIPTION OF DRAWINGS

FIGS. 4A and 4B are diagrams illustrating example time transition in sensor data when a monitoring-target apparatus is started and when the monitoring-target apparatus is deactivated, in which FIG. 4A is an example starting sequence, and FIG. 4B is an example deactivation sequence;

FIGS. 5A and 5B are diagrams exemplarily illustrating how a condition-mode-by-condition-mode sensor data extracting process unit cuts out “raw” sensor data as condition-mode-by-condition-mode sensor data, in which FIG. 5A is example “raw” sensor data, and FIG. 5B is example condition-mode-by-condition-mode data;

FIGS. 8A to 8C are diagrams exemplarily illustrating how transient condition multivariate data or steady condition multivariate data is created from condition-mode-by-condition-mode sensor data, in which FIG. 8A is an example case in which transient-condition multivariable data is created from start data, FIG. 8B is an example case in which transient-condition multivariable data is created from stop data, and FIG. 8C is an example case in which steady-condition multivariable data is created from operation data;

FIGS. 13A and 13B are diagrams illustrating an example abnormality difference link model built through the link-model building process, in which FIG. 13A is an example abnormality difference link model in a transient condition, and FIG. 13B is an example abnormality difference link model in a steady condition.

BEST MODE FOR CARRYING OUT THE INVENTION

Figure 1:
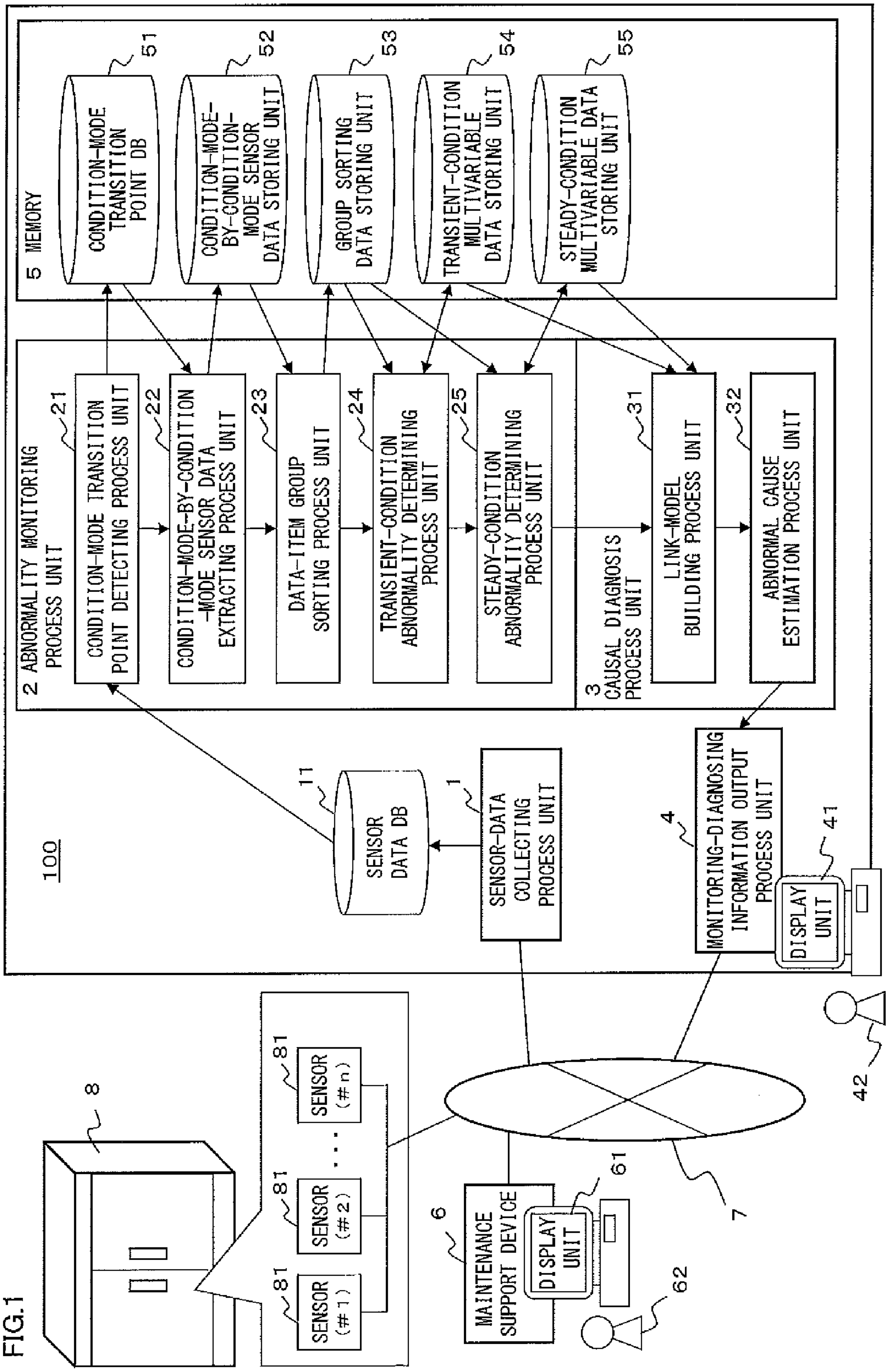
FIG. 1 is a diagram illustrating an example configuration of an abnormality monitoring-diagnosing device according to an embodiment of the present invention and an example general configuration of a whole system to which the abnormality monitoring-diagnosing device is applied.

A detailed explanation will be given of embodiments of the present invention with reference to the accompanying drawings. The same structure will be denoted by the same reference numeral throughout all figures for explaining the embodiments, and the repeated explanation will be omitted.

<Outline for Whole Configuration and Function>

FIG. 1 is a diagram illustrating an example configuration of an abnormality monitoring-diagnosing device according to an embodiment of the present invention and an example general configuration of a whole system to which the abnormality monitoring-diagnosing device is applied.

In FIG. 1, a monitoring-target apparatus 8 is a device subjected to abnormality monitoring and diagnosis by an abnormality monitoring-diagnosing device (monitoring diagnostic device) 100 according to an embodiment of the present invention. The monitoring-target apparatus 8 is, for example, an energy converting apparatus (e.g., a cogeneration apparatus, an electric apparatus, a power apparatus, or a heat-source apparatus), is typically constructed by a plurality of modules, and each module is constructed by a plurality of components (hereinafter, a structural element of the monitoring-target apparatus 8 including the module is collectively referred to as a "component" in this specification). Attached to predetermined portions of respective predetermined components or near those portions are sensors 81 that measure a physical quantity indicating the physical condition of such a portion. According to the example illustrated in FIG. 1, n number (where $n \geq 2$) of sensors 81 (#1 to #n) are provided inside the monitoring-target apparatus 8 or near the exterior of the monitoring-target apparatus.

The sensors 81 (#1 to #n) are connected to the abnormality monitoring-diagnosing device 100 via a communication network 7 like a LAN (Local Area Network), and transmit respective measured physical quantities to the abnormality monitoring-diagnosing device 100. Time-series data on various physical quantities measured by the sensors 81 (#1 to #n), i.e., data on a time transition is collectively referred to as "sensor data" in this specification.

In FIG. 1, the abnormality monitoring-diagnosing device 100 includes functional blocks, such as a sensor-data collecting process unit 1, an abnormality monitoring process unit 2, a causal diagnosis process unit 3, a monitoring-diagnosing information output process unit 4, a memory 5, and a sensor data DB (Database) 11. Moreover, the abnormality monitoring-diagnosing device is constructed by at least one computer that includes unillustrated hardware resources, such as a CPU (Central Processing Unit), a memory device, an input/output device, and a communication interface. The memory device includes a semiconductor memory like a RAM (Random Access Memory), and a hard magnetic disk device, etc.

In the abnormality monitoring-diagnosing device 100 configured as explained above, respective functions of the sensor-data collecting process unit 1, the abnormality monitoring process unit 2, the causal diagnosis process unit 3, and the monitoring-diagnosing information output process unit 4 are realized by any CPU of at least one computer constructing the abnormality monitoring-diagnosing device 100 that runs a predetermined program stored in the memory device. That is, the operational subject of each functional block is the CPU of a computer. Hence, in the following explanation in this specification, a description "AA process unit performs BB" means "the CPU of a computer runs a program for AA process unit to perform BB" except when an annotation is given.

When the abnormality monitoring-diagnosing device 100 is constructed by a plurality of computers, those plural computers are connected together so as to be communicable with each other via an exclusive communication line or the communication network 7. Data stored in the memory 5 and the sensor data DB 11 is mutually exchanged between the plurality of computers or shared as needed.

The function of each functional block of the abnormality monitoring-diagnosing device 100 will be explained with reference to FIG. 1.

The sensor-data collecting process unit 1 collects pieces of sensor data from the sensors 81 (#1 to #n) for each predetermined time (e.g., for each 0.1 second: this "predetermined time" is set in accordance with the operation characteristics of the abnormality monitoring-diagnosing device 100), and stores the collected sensor data in the sensor data DB 11 in association with respective sensors 81 (#1 to #n). Hence, the sensor data DB 11 stores the sensor data of each sensor 81 (#1 to #n) in a time series manner. That is, the sensor data is time-series data of a physical quantity indicating a condition of the component.

The abnormality monitoring process unit 2 monitors the sensor data collected by the sensor-data collecting process unit 1 in a real-time manner, and detects sensor data indicating a behavior different from a normal operation, but the specific process content of the detection will be discussed later. In general, when a component breaks down, not only the sensor data from the sensor 81 attached to this component indicates an abnormal behavior, but also the sensor data from the sensor 81 attached to another component affected by the operation result of the former component often indicates an abnormal behavior. That is, plural pieces of sensor data indicating an abnormal behavior are detected in general.

The causal diagnosis process unit 3 analyzes a mutual time and spatial (structural) dependency relation between the plural pieces of sensor data detected by the abnormality monitoring process unit 2 and indicating abnormal behaviors, and estimates the cause of the abnormal behavior indicated by each piece of sensor data, i.e., diagnosis whether or not any component breaks down based on the analysis result. The specific diagnosis process will be discussed later.

The monitoring-diagnosing information output process unit 4 displays the sensor data obtained as explained above and indicating an abnormal behavior and information on the component diagnosed as defective, etc., on a display unit 41. An abnormality-detected initial operation manager 42 can obtain through such a display necessary information for an initial operation recovering from the abnormality. The monitoring-diagnosing information output process unit 4 transmits information on the component diagnosed as defective, etc., to a maintenance support device 6 through the communication network 7.

The maintenance support device 6 receives information on the component diagnosed as defective, etc., and displays procedure information on a display unit 61 that a maintenance worker 62 should do, such as a component replacement or a component adjustment, based on the received information. As a result, the maintenance worker 62 can easily carry out the maintenance work.

<Process Flow of Abnormality Monitoring-diagnosing Process>

Figure 2:
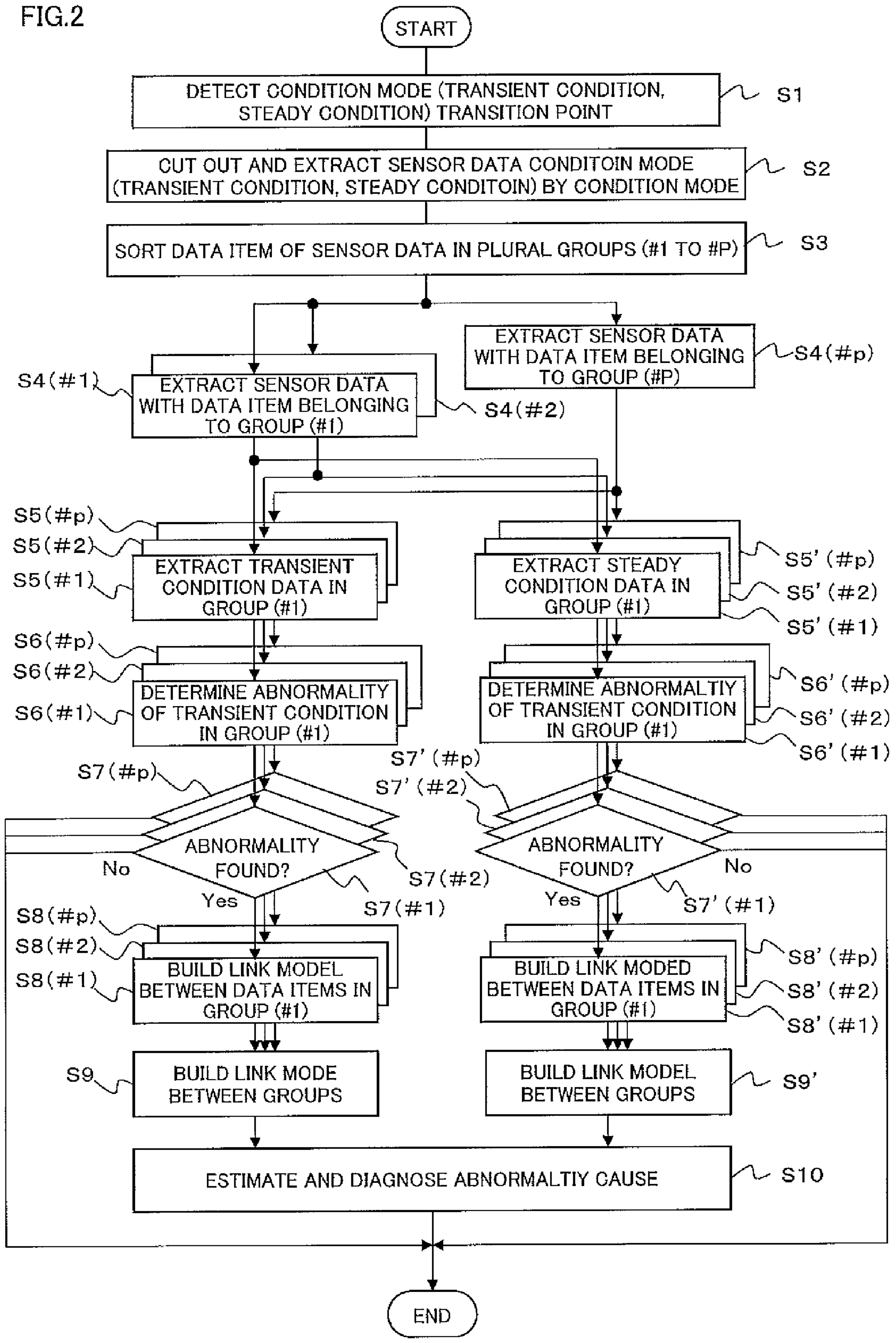
FIG. 2 is a diagram illustrating an example process flow of an abnormality monitoring-diagnosing process by an abnormality monitoring process unit and a causal diagnosis process unit.

Next, with reference to FIG. 2 and FIG. 1, the outline of the process by the abnormality monitoring process unit 2 and the causal diagnosis process unit 3 will be explained. Thereafter, with reference to the figures including and following to FIG. 3, the detailed content of each process in FIG. 2 will be explained. FIG. 2 is a diagram illustrating an example outline process flow of an abnormality monitoring-diagnosing process by the abnormality monitoring process unit 2 and the cause diagnosis process unit 3.

The CPU of the abnormality monitoring-diagnosing device 100 (hereinafter, simply referred to as the CPU) executes a process as a condition-mode transition point detecting process unit 21 every time the sensor data is collected by the sensor-data collecting process unit 1 and is stored in the sensor data DB 11, or for each predetermined time cycle. That is, the CPU detects a condition-mode transition point from the pieces of sensor data stored in a time-series manner (step S1). Data on the detected condition-mode transition point is stored in a condition-mode transition point DB 51 in the memory 5.

The condition mode indicates a transient condition and a steady condition, and the transient condition indicates a condition during a transition from a steady condition to another steady condition. For example, a rising period from the activation of the monitoring-target apparatus 8 to a rated operation condition, and a falling period from a rated operation condition at the time of the deactivation to the deactivated condition are transient conditions, and a rated operation condition until the start of the falling at the time of deactivation after the completion of rising at the time of activation is a steady condition.

Next, the CPU executes a process as a condition-mode-by-condition-mode sensor data extracting process unit 22 which cuts out and extracts condition-mode-by-condition-mode sensor data from the pieces of sensor data stored in the sensor data DB 11 in a time-series direction with the detected condition-mode transition point being as a boundary (step S2), and which stores the extracted condition-mode-by-condition-mode sensor data in a condition-mode-by-condition-mode sensor data storing unit 52 (see FIG. 5 to be discussed later).

Next, the CPU executes a process as a data-item group sorting process unit 23 that sorts the data items of the sensor data into a plurality of (e.g., p number) groups (step S3). The data item is identification information (i.e., the name of sensor data) of the sensor data identified by each sensor 81. Information for identifying the data item belonging to each of the p number of groups sorted in this process is stored in a group-sorting-data storing unit 53.

Next, the CPU executes a process as a transient-condition abnormality determining process unit 24 which extracts the sensor data on the transient condition belonging to respective groups (#1) to (#p) from the condition-mode-by-condition-mode sensor data storing unit 52 for each group (#1) to (#p) (step S5 (#1) to (#p), sums up those pieces of extracted sensor data as transient condition multivariate data having the data items as the item names in a row, and stores the transient condition multivariate data in a transient condition multivariate data storing unit 54. Likewise, the CPU executes a process as a steady-condition abnormality determining process unit 25 which extracts the sensor data on the steady condition belonging to respective groups (#1) to (#p) from the condition-mode-by-condition-mode sensor data storing unit 52 for each group (#1) to (#p) (step S5' (#1) to (#p)), sums up the extracted sensor data as steady-condition multivariable data having the data items as the item names in a row, and stores the steady-condition multivariable data in a steady-condition multivariable data storing unit 55 (see FIG. 8 to be discussed later).

Through those processes, the sensor data is cut in the two-dimensional directions that are the time-series direction and the data-item direction, and the transient-condition multivariable data and the steady-condition multivariable data are created. The order of cutting out the sensor data in the time-series direction and in the data-item direction may be inverted.

Next, the CPU performs an abnormality determination on the transient condition for each group (#1) to (#p) (step S6 (#1) to (#p)), and when no abnormality is found (step S7 (#1) to (#p): NO), the process is terminated. Likewise, the CPU performs an abnormality determination on the steady condition (step S6' (#1) to (#p)), and when no abnormality is found (step S7' (#1) to (#p): NO), the process is terminated.

Conversely, when an abnormality is found through the abnormality determination on the transient condition (step S7 (#1) to (#p): YES), the CPU executes a process as a link-model building process unit 31 which builds, for each group (#1) to (#n), a link model indicating a mutual relationship between the data items in the group using the transient-condition multivariable data of that group (step S8 (#1) to (#p)), and also builds a link model indicating a mutual relationship between the p number of groups (step S9).

When an abnormality is found in the abnormality determination on the steady condition (step S7' (#1) to (#p): YES), the CPU executes a process as the link-model building process unit 31 which builds, for each group (#1) to (#p), a link model indicating a mutual relationship between the data items in the group using the sensor data of the steady condition in that group (step S8' (#1) to (#p)), and further builds a link model indicating a mutual relationship between the p number of groups (step S9').

Next, the CPU executes a process as an abnormal cause estimation process unit 32 which estimates and diagnoses the cause of an abnormality based on the link model between the data items in each group and the link model between the groups with respect to data on the transient condition, and the link model between the data items in each group and the link model between the groups with respect to data on the steady condition (step S10).

<Condition-Mode Transition Point Detecting Process>

Figure 3:
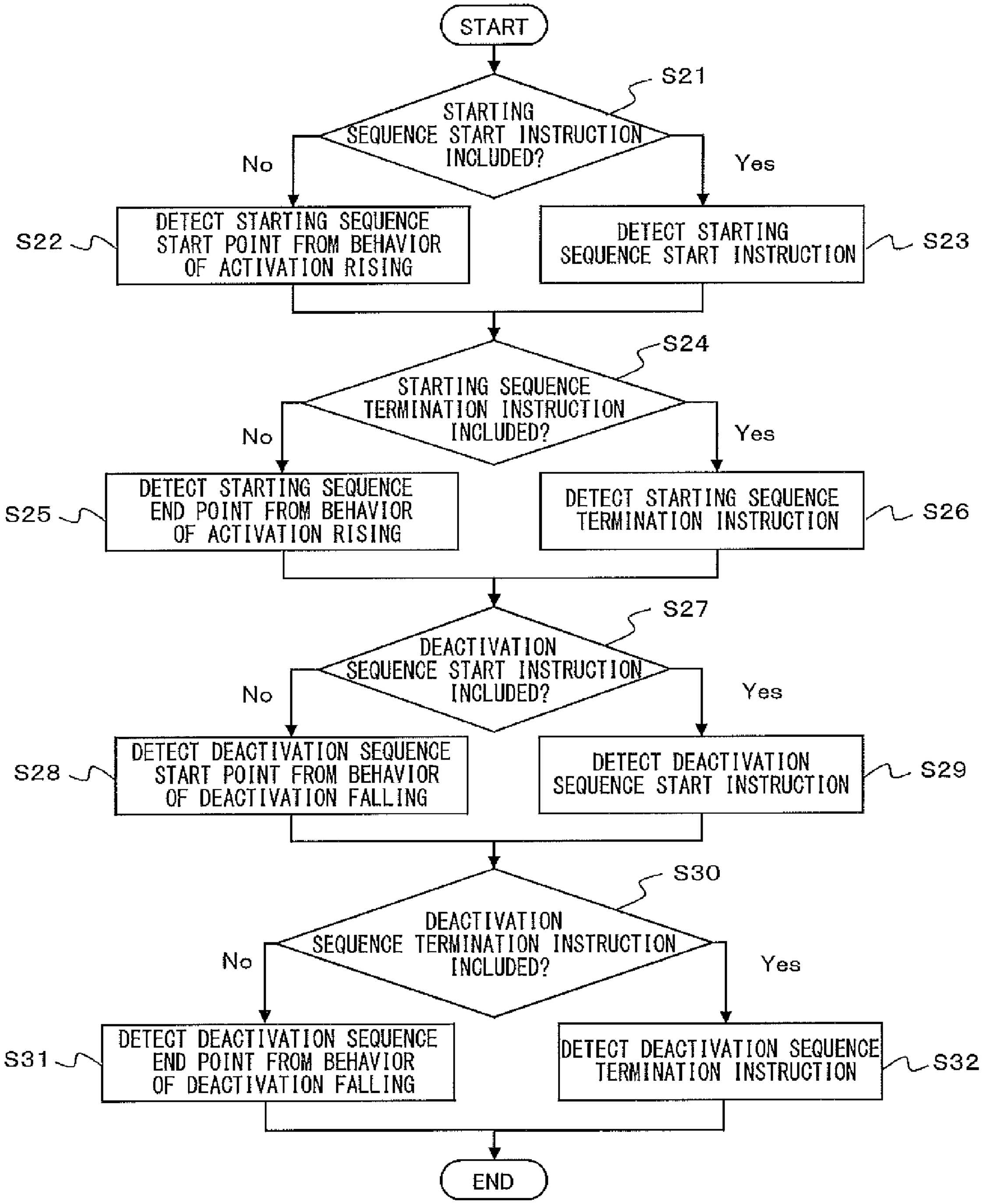
FIG. 3 is a diagram illustrating an example detailed process flow of a condition-mode transition point detecting process.
Figure 4A:
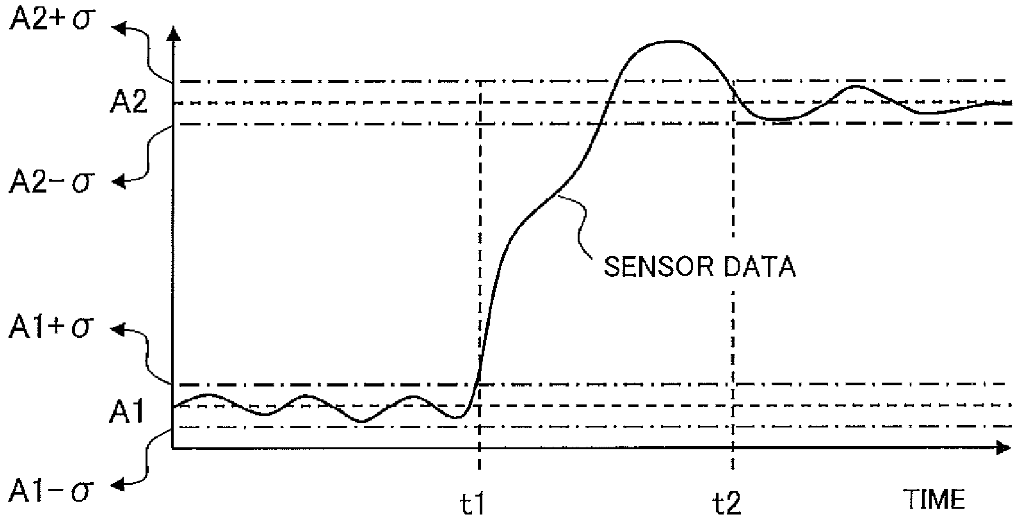
Figure 4B:
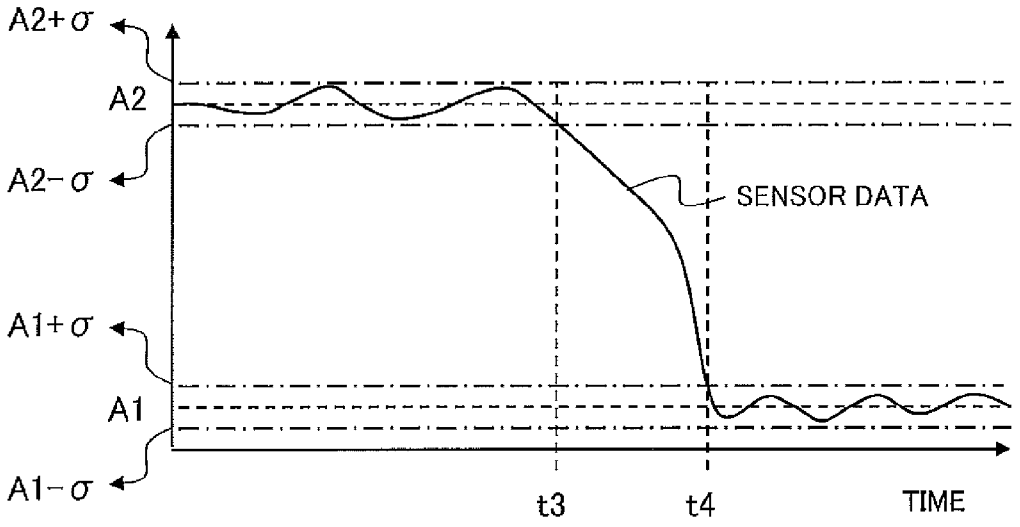

The condition-mode transition point detecting process is a process by a condition-mode transition point detecting process unit 21, and is a process of detecting a condition-mode transition point for each piece of sensor data collected by the sensor-data collecting process unit 1 and stored in the sensor data DB 11. Hereinafter, with reference to FIG. 3 and FIGS. 4A and 4B, the detail of the condition-mode transition point detecting process will be explained. FIG. 3 is a diagram illustrating an example detailed process flow of the condition-mode transition point detecting process. FIGS. 4A and 4B are diagrams illustrating an example time transition in sensor data when the monitoring-target apparatus 8 is started and deactivated. FIG. 4A is an example starting sequence, and FIG. 4B is an example deactivation sequence.

The measurement-target apparatus 8 may include an unillustrated computer that controls a start or deactivation sequence in some cases. Such a computer may have a function of outputting event data (data having a time and an event paired), such as a starting sequence starting instruction or a deactivation sequence starting instruction at the time of changing a sequence. In this case, the abnormality monitoring-diagnosing device 100 utilizes the time included in the event data to detect the condition-mode transition point.

Conversely, when the monitoring-target apparatus 8 has no function of outputting event data like a starting sequence starting instruction or a deactivation sequence starting instruction, the abnormality monitoring-diagnosing device 100 obtains the condition-mode transition point based on a behavior of the time transition of the sensor data. Moreover, even if the monitoring-target apparatus 8 has a function of outputting a starting sequence starting instruction or a deactivation sequence starting instruction, such a monitoring-target apparatus often has no starting sequence terminating instruction or a deactivation sequence terminating instruction. In this case, the abnormality monitoring-diagnosing device 100 obtains a starting sequence ending point or a deactivation sequence ending point based on a behavior of the time transition of the sensor data.

As illustrated in FIG. 3, first, the CPU determines whether or not the event data output by the monitoring-target apparatus 8 includes a starting sequence starting instruction (step S21), detects a starting sequence starting point (a time t1 in FIG. 4A) from the rising behavior of the sensor data (step S22) when no starting sequence starting instruction is included (step S21: NO), and records the time of detection as a starting sequence starting point in the condition-mode transition point DB 51.

More specifically, when the monitoring-target apparatus 8 starts a starting sequence, pieces of sensor data, such as a speed, a temperature, and pressure, indicate a rising varying (see FIG. 4A). Hence, the CPU records, as a starting sequence starting point, the time (t1) that exceeds a deactivated condition varying range (A1+σ) obtained from a time-series average value (A1) of past sensor data before activation and a one-sided varying range (σ) in the condition-mode transition point DB 51.

Conversely, in the determination in the step S21, when a starting sequence starting instruction is included (step S21: YES), the CPU detects that starting sequence starting instruction (step S23), and records the time of detection as a starting sequence starting point in the condition-mode transition point DB 51.

Next, the CPU determines whether or not the event data output by the monitoring-target apparatus 8 includes a starting sequence terminating instruction (step S24), detects a starting sequence ending point (a time t2 in FIG. 4A) from a rising behavior of the sensor data (step S25) when no starting sequence terminating instruction is included (step S24: NO), and records the time of detection as a starting sequence ending point in the condition-mode transition point DB 51.

More specifically, when the monitoring-target apparatus 8 completes the starting sequence, pieces of sensor data, such as a speed, a temperature, and pressure, substantially complete a rising behavior, and indicate a settling to the operated condition (see FIG. 4A). Hence, the CPU records, as a starting sequence ending point, the time (t2) settled in an operated condition varying range (A2±σ) obtained from a time-series average value (A2) of the past operated conditions of the sensor data and the one-sided varying range (σ) in the condition-mode transition point DB 51.

Conversely, in the determination in the step S24, when a starting sequence terminating instruction is included (step S24: YES), the CPU detects the starting sequence terminating instruction (step S26), and records the time of detection as a starting sequence ending point in the condition-mode transition point DB 51.

Next, the CPU determines whether or not the event data output by the monitoring-target apparatus 8 includes a deactivation sequence starting instruction (step S27), detects a deactivation sequence starting point (a time t3 in FIG. 4B) from a falling behavior of the sensor data (step S28) when no deactivation sequence starting instruction is included (step S27: NO), and records, as a deactivation sequence starting point, the time of detection in the condition-mode transition point DB 51.

More specifically, when the monitoring-target apparatus 8 starts a deactivation sequence, pieces of sensor data, such as a speed, a temperature, and pressure, indicate a falling variation from the operated condition (see FIG. 4B). Hence, the CPU records, as a deactivation sequence starting point, the time (t3) exceeding an operated condition varying range (A2+σ) that can be obtained from the time-series average value (A2) of the past sensor data on the operated condition in the sensor data and the one-sided varying range (σ) in the condition-mode transition point DB 51.

Conversely, in the determination in the step S27, when a deactivation sequence starting instruction is included (step S27: YES), the CPU detects that deactivation sequence starting instruction (step S29), and records the time of detection in the condition-mode transition point DB 51 as a deactivation sequence starting point.

Next, the CPU determines whether or not the event data output by the monitoring-target apparatus 8 includes a deactivation sequence terminating instruction (step S30), detects a deactivation sequence ending point (a time t4 in FIG. 4B) from the falling behavior of the sensor data (step S31) when no deactivation sequence starting instruction is included (step S30: NO), and records, as a deactivation sequence ending point, the time of detection in the condition-mode transition point DB 51.

More specifically, when the monitoring-target apparatus 8 completes a deactivation sequence, pieces of sensor data, such as a speed, a temperature, and pressure, substantially complete falling, and indicate a settling to a deactivated condition (see FIG. 4B). Hence, the CPU records, as a deactivation sequence ending point, the time (t4) settled in a deactivated condition varying range (A1±σ) obtained from the time-series average value (A1) of the sensor data on the past deactivated conditions and the one-sided varying range (σ) in the condition-mode transition point DB 51.

<Condition-Mode-by-Condition-Mode Sensor Data Extracting Process>

The condition-mode-by-condition-mode sensor data extracting process is a process by the condition-mode-by-condition-mode sensor data extracting process unit 22, and is a process of cutting out each piece of sensor data stored in the sensor data DB 11 for each condition mode like an activation, an operation and a deactivation in the time-series row direction using the time information of the condition mode transition point recorded in the condition-mode transition point DB 51, and of storing the cut-out data in the condition-mode-by-condition-mode sensor data storing unit 52.

FIG. 5 is a diagram exemplarily illustrating how the condition-mode-by-condition-mode sensor data extracting process unit 22 cuts out "raw" sensor data as condition-mode-by-condition-mode sensor data. In FIG. 5, "SS11" is information indicating a data item (a name of the sensor data) of the sensor data. Hence, FIG. 5 illustrates that three pieces of condition-mode-by-condition-mode sensor data "activation data", "operation data", and "deactivation data" are cut out from "raw" time-series data of a piece of sensor data specified by the data item SS11 and are extracted.

Hereinafter, a process flow (unillustrated) by the condition-mode-by-condition-mode sensor data extracting process unit 22 will be explained in a simplified manner.

The CPU adds, to the time-series data of "raw" sensor data (e.g., sensor data having a data item of SS11) stored in the sensor data DB 11, condition flags that are "standstill", "activation", "operation", "termination", and "standstill" with the starting sequence starting point t1, the starting sequence ending point t2, the deactivation sequence starting point t3, and the deactivation sequence ending point t4 detected by the condition-mode transition point detecting process unit 21 being as respective boundaries (see FIG. 5A).

Next, the CPU divides the "raw" sensor data for each added condition flag, and cuts out respective pieces of data added with condition flags of "activation", "operation" and "deactivation" as "activation data", "operation data", and "deactivation data" (see FIG. 5B). Subsequently, the cut-out "activation data", "operation data" and "deactivation data" are stored in the condition-mode-by-condition-mode sensor data storing unit 52.

The sensor data piece added with "standstill" indicates a non-operated condition like no power is fed to the monitoring-target apparatus 8 itself, and thus such sensor data piece is not cut out and is out of the target for the abnormality monitoring-diagnosing. However, sensor data having a condition flag of "standstill" may be cut out and may be subjected to the abnormality monitoring-diagnosing as "standstill data".

<Data-item Group Sorting Process>

The data-item group sorting process is a process by the data-item group sorting process unit 23, and is a process of sorting the data items of the sensor data into a plurality of groups. That is, this is a process of, among the data items of the plural pieces of sensor data, collecting ones having a large mutual connection in the behavior of the sensor data identified by that data item and grouping those.

Example techniques of collecting and grouping pieces of sensor data (of the data items) with a large connection are a technique through a BOM (Bill of Materials: component structure table) of the monitoring-target apparatus 8 and a technique of performing cluster analysis on the sensor data, etc., but either one of the techniques is fine. Hereinafter, an explanation will be given of a technique utilizing BOM and a technique of performing cluster analysis in a simplified manner.

Figure 6:
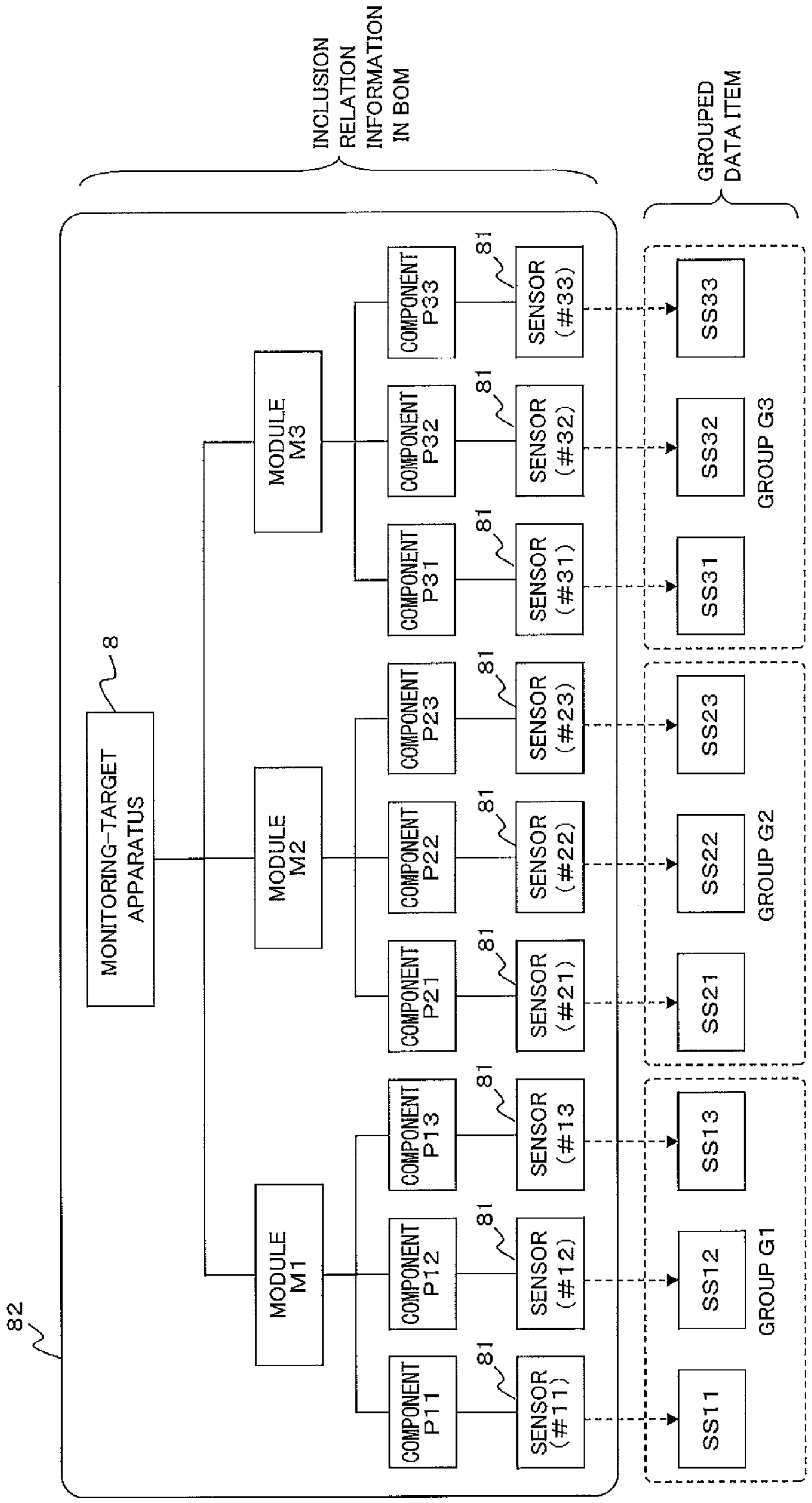
FIG. 6 is a diagram exemplarily illustrating how data items of sensor data are classified using a BOM.

FIG. 6 is a diagram exemplarily illustrating how the data items of the sensor data are sorted through BOM. As illustrated in FIG. 6, a BOM 82 is information indicating an inclusion relation of each component constructing the monitoring-target apparatus 8 in a hierarchical manner. In the case of FIG. 6, the monitoring-target apparatus 8 includes, for example, three modules M1 to M3, and each module M1 (where i=1 to 3) includes three components Pi1 to Pi3 (where i=1 to 3). Each component Pij (where i=1 to 3 and j=1 to 3) is provide with the sensor 81 (#ij), and each sensor 81 (#ij) outputs sensor data with a data item of SSij.

In general, it can be deemed that a mutual dependency relation of the behavior of pieces of sensor data with the data items of SS11 to SS13 output by the sensors 81 attached to the components P11 to P13 included in a module M1 is often larger than a dependency relation between pieces of sensor data with the data items of SS21 to SS33 output by the sensors 81 attached to the components P21 to P33 included in other modules M2 and M3. Hence, in this example, the data items SS11 to SS33 of the pieces of sensor data are grouped in accordance with the modules M1 to M3 indicated by the BOM.

That is, the data item SSij is taken as identification information of the sensor data output by the sensor 81 (#ij) attached to the component Pij, and when the BOM 82, i.e., the inclusion relations for the monitoring-target apparatus 8, the modules M1 to M3, and the components P11 to P33 are given, the CPU can easily sort the data item SSij into a group of G1 to G3 corresponding to the modules M1 to M3 based on the above-explained pieces of information.

It is presumed that the BOM 82 is stored in an unillustrated design data base server coupled with the communication network 7 in FIG. 1 for example, and the CPU of the abnormality monitoring-diagnosing device 100 is capable of obtaining the BOM 82 for the monitoring-target apparatus 8 from the design data base server via the communication network 7 as needed.

In this case, when the BOM 82 is an expression of modules in multiple hierarchies, the data items are also sorted in multiple hierarchies, but sorting of the data items in multiple hierarchies does not bring about any problem. Moreover, it is unnecessary that the hierarchy structure of the sorted group does not match the hierarchy structure of the module of the BOM 82 in a one-on-one manner. For example, a plurality of modules may be combined to a sorted group as needed in such a way that the number of components (however, the number of components having respective sensors 81) included in each sorted group is settled within a predetermined number range.

Figure 7:
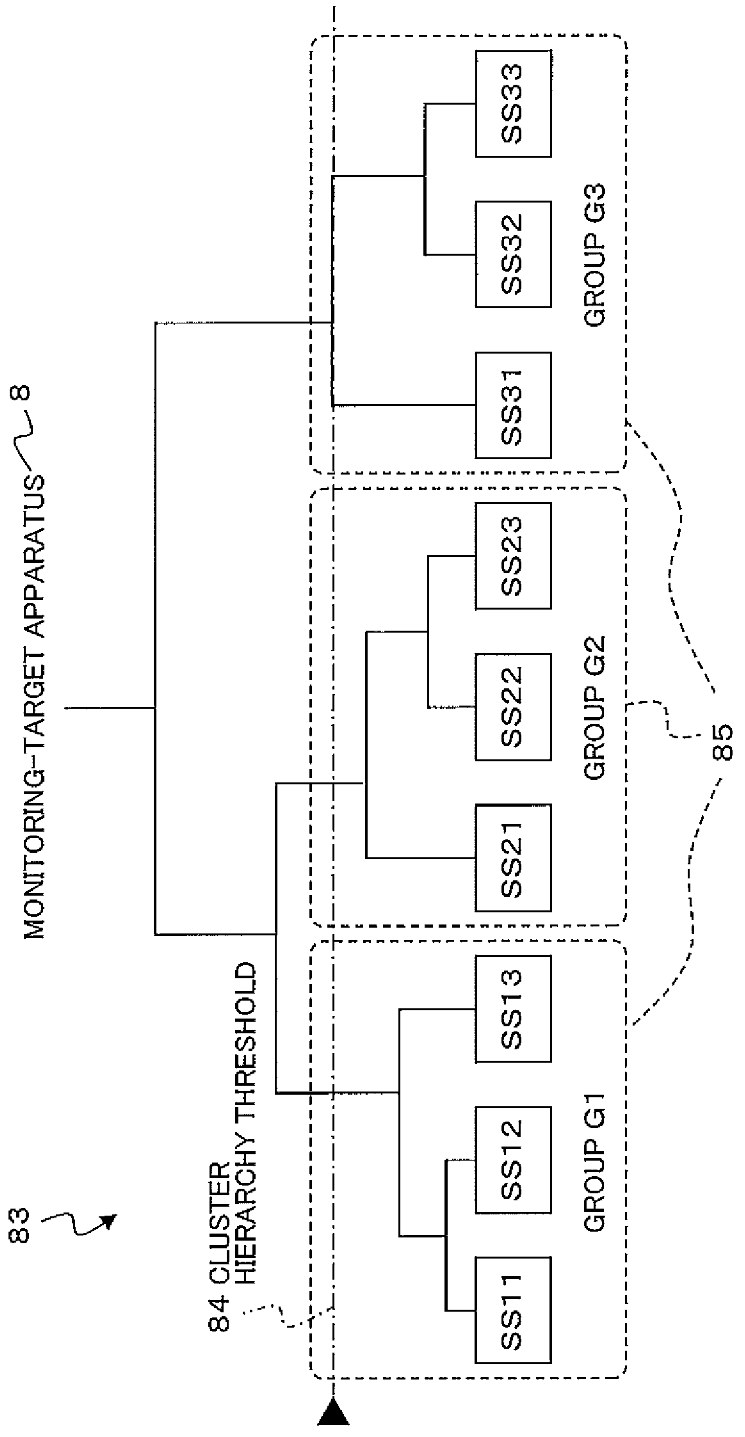
FIG. 7 is a diagram exemplarily illustrating how data items are classified based on a cluster analysis on sensor data between data items.

FIG. 7 is a diagram exemplarily illustrating how the data items are sorted based on a cluster analysis on the sensor data between the data items. In general, in the case of a cluster analysis, a process of obtaining a squared distance between clusters and of combining two clusters having the shortest squared distance is repeatedly executed. In this example, a cluster analysis is performed in accordance with such a procedure.

Hence, it is presumed that pieces of sensor data Xi=(xi1, xi2, . . . xin) of a data item i are taken as a cluster. Next, the CPU calculates a mutual correlation function Rij between two clusters i and j, i.e., the pieces of sensor data of two data items (#ij), and calculates a squared distance Dij between the pieces of sensor data of the two data items (ij) using the calculated mutual correlation function Rij. At this time, if sensor data Xi is standardized, the squared distance Dij thereof can be obtained through a following formula (1).

[Formula 1]

$$D_{ij} = 2 \cdot (1 - R_{ij}) \tag{1}$$

wherein $$R_{ij} = \sum_{k=1}^{n} (x_{ik} \cdot x_{jk}),\ \sum_{k=1}^{n} x_{ik}^2 = 1$$

Next, the CPU obtains the smallest value among the squared distances Dij between the pieces of sensor data of the two data items (#ij), and combines the pieces of sensor data of a data item (#uv) at this time to a cluster. As a result, the number of clusters decreases by one.

Next, the CPU calculates a squared distance Dsh between a cluster h obtained by combining a cluster u and a cluster v and another cluster s (s u, and s v) in accordance with a formula (2).

[Formula 2]

$$D_{sh}^2 = \alpha_u \cdot D_{su}^2 + \alpha_v \cdot D_{sv}^2 + \beta \cdot D_{uv}^2 + \gamma \cdot |D_{su}^2 - D_{sv}^2| \tag{2}$$

Coefficients $\alpha_u$, $\alpha_v$, $\beta$, and $\gamma$ are numerical values depending on an algorithm of the cluster analysis, and for example, set as $\alpha_u$=0.5, $\alpha_v$=0.5, $\beta$=0, and $\gamma$=−0.5 in the case of a shortest distance technique. Moreover, the sensor data of a combined cluster h can be obtained by calculating an average, or calculating a major element, etc., and is taken as a cluster representing value.

The CPU obtains dendrogram (dendric drawing) 83 illustrated in FIG. 7 by repeating the above-explained process until the number of the clusters becomes one. The vertical axis of the dendrogram 83 indicates a squared distance between respective clusters or combined clusters.

The CPU sets a cluster hierarchy threshold 84 in the obtained dendrogram 83, divides the dendrogram 83 into cluster structures by the number of equal to or smaller than the cluster hierarchy threshold 84, and groups the data items SS11 to SS33 based on divided dendrograms 85. In the example case illustrated in FIG. 7, grouping is made in such a way that the data items SS11 to SS13 are taken in a group G1, the data items SS21 to SS23 are taken into a group G2, and the data items SS31 to SS33 are taken into a group G3.

The CPU obtains the cluster hierarchy threshold 84 used in this case through, for example, following procedures. That is, the CPU sequentially calculates a correlation coefficient matrix between respective cluster representing values (sensor data in the lowest hierarchy) from the lower hierarchy in the dendrogram, and calculates an index called Variance Inflation Factor (VIF) defined by diagonal factors of an inverse matrix of that correlation coefficient matrix. Next, a squared distance between clusters in a hierarchy where the VIF becomes smaller than a predetermined value (e.g., 10) is taken as the cluster hierarchy threshold 84.

For example, in FIG. 7, the CPU repeats a process of calculating the VIF from the pieces of sensor data having the data items of SS11 to SS33 in the lowest hierarchy in the dendrogram 83, determining that the cluster division is insufficient when the VIF contains elements by the number of equal to or greater than a preset number (e.g., 10), transitioning the process to an upper hierarchy successively until the number of all elements in the VIF becomes smaller than 10 while calculating the VIF, and determining the VIF.

In FIG. 7, the cluster hierarchy threshold 84 is set based on a determination that the number of all elements of the VIF becomes smaller than 10 when the cluster of the sensor data with the data item of SS31 is combined with the cluster of the pieces of sensor data with the data items of SS32+SS33. Next, the cluster structures up to the hierarchy equal to or smaller than the cluster hierarchy threshold 84 sorts the data items SS11 to SS33 in the groups G1, G2, and G3.

As explained above, pieces of information on the data items sorted in the plurality of groups through the BOM 82 or the cluster analysis, etc., are stored in the group-sorting-data storing unit 53 as information associating the identification information of the group with the data item belonging to that group.

<Transient-condition Abnormality Determining Process and Steady-condition Abnormality Determining Process>

A transient-condition abnormality determining process is a process by the transient-condition abnormality determining process unit 24, and is a process of determining a presence/absence of an abnormality in the transient condition based on the condition-mode-by-condition-mode sensor data (in the example case in FIG. 8, activation data and deactivation data) stored in the condition-mode-by-condition-mode sensor data storing unit 52. Moreover, a steady-condition abnormality determining process is a process by the steady-condition abnormality determining process unit 25, and is a process of determining a presence/absence of an abnormality in the steady condition based on the condition-mode-by-condition-mode sensor data (in the example case in FIG. 8, operation data) stored in the condition-mode-by-condition-mode sensor data storing unit 52.

The CPU extracts, for each group of the data item sorted through the data-item group sorting process, the sensor data on the transient condition belonging to that group from the condition-mode-by-condition-mode sensor data storing unit 52 at the beginning of the transient-condition abnormality determining process, generates transient-condition multivariable data having the data item as the item name in a row, and stores the generated data in the transient-condition multivariable data storing unit 54. Moreover, the CPU extracts, for each group of the data item sorted through the data-item group sorting process, the sensor data on the steady condition belonging to that group from the condition-mode-by-condition-mode sensor data storing unit 52 at the beginning of the steady-condition abnormality determining process, generates steady-condition multivariable data having the data item as the item name in a row, and stores the generated data in the steady-condition multivariable data storing unit 55.

FIGS. 8A to 8C are diagrams exemplarily illustrating how transient-condition multivariable data or steady-condition multivariable data is generated from the condition-mode-by-condition-mode sensor data. FIGS. 8A to 8C illustrate an example case in which transient-condition multivariable data and steady-condition multivariable data is generated for the data items SS11 to SS13 in the group G1, but the same is true of the other groups.

The CPU sorted in such a way that the data items SS11, SS12, and SS13 belong to the group G1 through the data-item group sorting process (see FIG. 6 and FIG. 7). Hence, as illustrated in FIG. 8A, the CPU extracts the activation data with the data item SS11, the activation data with the data item SS12, and the activation data with the data item SS13 from the condition-mode-by-condition-mode sensor data storing unit 52, collects those pieces of data as a table, and generates, as transient-condition multivariable data, group-G1 activation data.

As illustrated in FIG. 8B, the CPU extracts the deactivation data with the data item SS11, the deactivation data with the data item SS12, and the deactivation data with the data item SS13 from the condition-mode-by-condition-mode sensor data storing unit 52, collects those pieces of data as a table, and generates, as transient-condition multivariable data, group-G1 deactivation data. At this time, the CPU may join the group-G1 activation data and the group-G1 deactivation data to generate a piece of group-G1 transient-condition data (unillustrated).

As illustrated in FIG. 8C, the CPU extracts the operation data with the data item SS11, the operation data with the data item SS12, and the operation data with the data item SS13 from the condition-mode-by-condition-mode sensor data storing unit 52, collects those pieces of data as a table, and generates, as a steady-condition multivariable data, group-G1 operation data.

Figure 9:
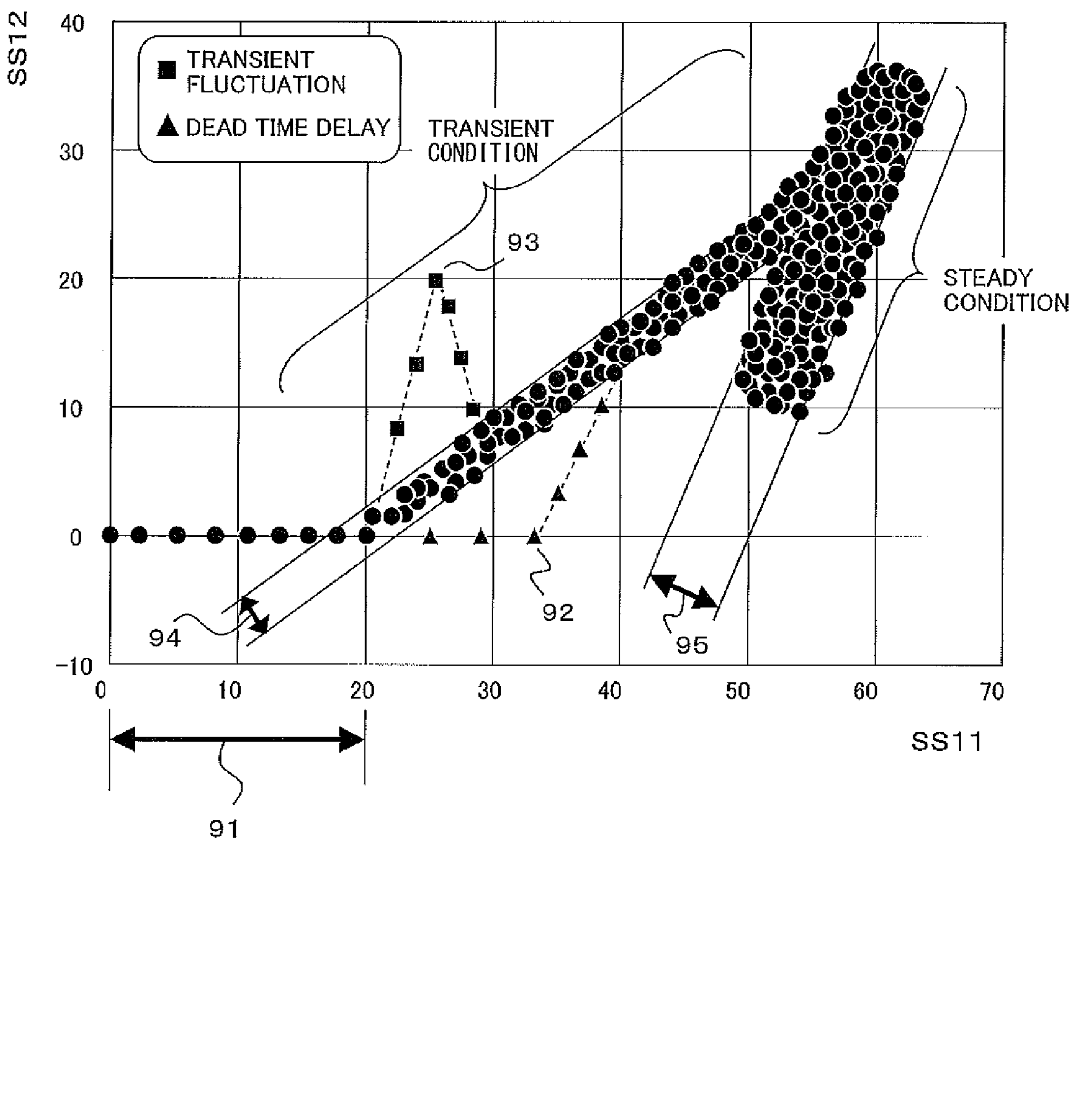
FIG. 9 is an example scatter diagram of data obtained by sampling sensor data with a data item SS11 (horizontal axis) and a data item SS12 (vertical axis) for a predetermined time interval in a transient condition and in a steady condition.
Figure 10:
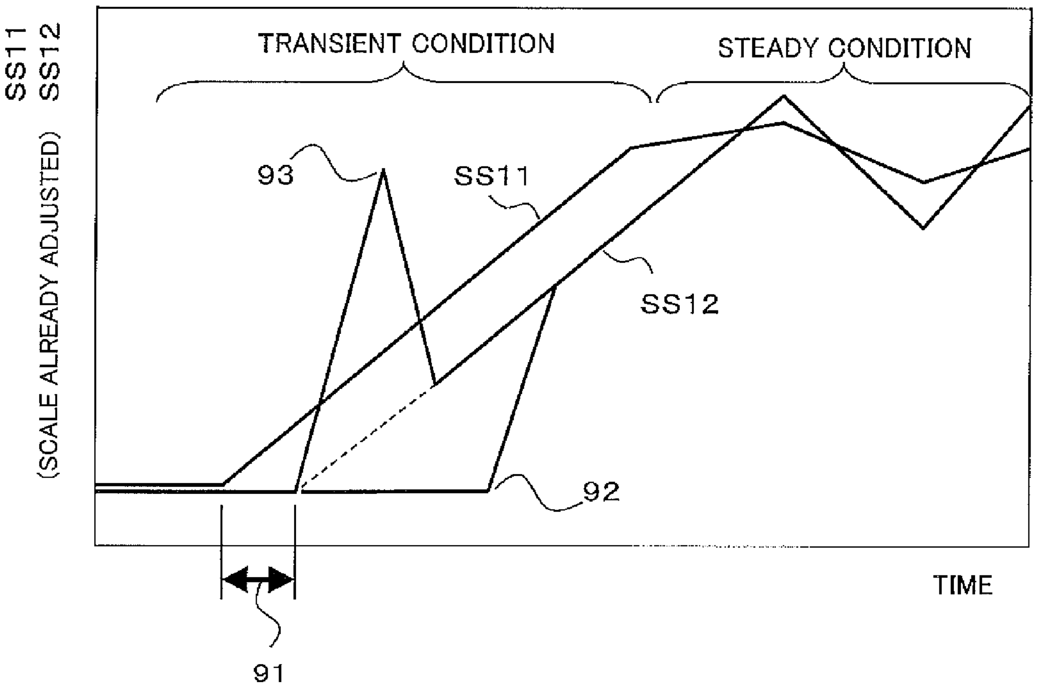
FIG. 10 is an example time-series transition diagram of sensor data with the data item SS11 and the data item SS12.

Next, with reference to FIG. 9 and FIG. 10, an explanation will be given of a method of determining an abnormality of a control performance in the transient-condition abnormality determining process and in the steady-condition abnormality determining process. FIG. 9 is an example scatter diagram obtained by sampling pieces of sensor data with the data item of SS11 (horizontal axis) and the data item of SS12 (vertical axis) in the transient condition and in the steady condition at a predetermined time interval. FIG. 10 is an example time-series transition diagram of pieces of sensor data with the data item of SS11 and the data item of SS12 (sampling point unillustrated). In the example cases illustrated in FIG. 9 and FIG. 10, it is presumed that the data item SS11 is sampling data of a signal relating to a control setting value, and the data item SS12 is sampling data of a signal relating to a control response value. The vertical axis of FIG. 10 has a scale adjusted in such a way that the pieces of time-series sensor data with the two data items SS11 and SS12 overlap.

As illustrated in FIG. 9 and FIG. 10, a dead time delay 91 is present between the pieces of sensor data with the two data items of SS11 and SS12. The dead time delay 91 is usually within a predetermined range. When, however, the dead time delay 91 becomes out of the predetermined range and becomes large, a dead time delay abnormality 92 occurs. When the data item SS12 excessively responds to a change in the data item SS11, a transient fluctuation abnormality 93 occurs.

Such an abnormality in the transient condition can be detected by detecting the deviancy of the sensor data from the normal scatter diagram of the transient condition illustrated in FIG. 9. When, for example, the scatter point deviates to the upper area of a distribution width 94 of a predetermined transient condition, it indicates an overshoot transient fluctuation abnormality 93, and when the scatter point deviates to the lower area of the distribution width of the predetermined transient condition, it indicates an undershoot transient fluctuation abnormality (unillustrated). A case having no response from the data item SS12 (including a case in which the value of the sensor data is 0) results in the dead time delay abnormality 92.

Likewise, in the scatter diagram (see FIG. 9) of the pieces of sensor data (operation data) with the data items of SS11 and SS12 in the steady condition, when the scatter point is out of a distribution width 95 of a predetermined steady condition, it indicates a control performance abnormality (unillustrated).

As explained above, when a scatter diagram in the normal condition, i.e., in the normal operation is given, regardless of whether the condition is the transient condition or the steady condition, an abnormality of the sensor data can be detected through a statistical distribution width, etc., obtained from that scatter diagram. Hence, the CPU creates a scatter diagram between respective data items based on the transient-condition multivariable data and the steady-condition multivariable data for each group obtained in advance, and determines whether or not each scatter point is within a predetermined range. When each scatter point is out of the predetermined range, it is determined that the sensor data of that data item is abnormal.

The method of determining an abnormality from the scatter diagrams for the transient condition and the steady condition using the two data items, but the number of the data items is not limited to two, and may be equal to or greater than three.

<Link-model Building Process>

The link-model building process is a process by the link-model building process unit 31, and is a process of, using the transient-condition multivariable data and the steady-condition multivariable data for each group, building a link model representing a mutual relationship between the data items in the group and a link model representing a mutual relationship between the groups.

The process of building such link models can be realized by, for example, applying a concept of a graphical model disclosed in Non-patent literature 1. According to such a graphical model, the presence/absence of a causal association can be determined from the correlation coefficient between the pieces of sensor data of the two data items, and the direction of cause and result can be determined from time anticipation information for a change point occurrence of behaviors of both data items. That is, data item which has changed in advance in time is determined as a "cause" and the data item which starts changing subsequently is determined as a "result". When the causal association and the direction of cause and result between the two data items are obtained for between all data items in the group, a link model between the data items in the group can be built.

Figure 11:
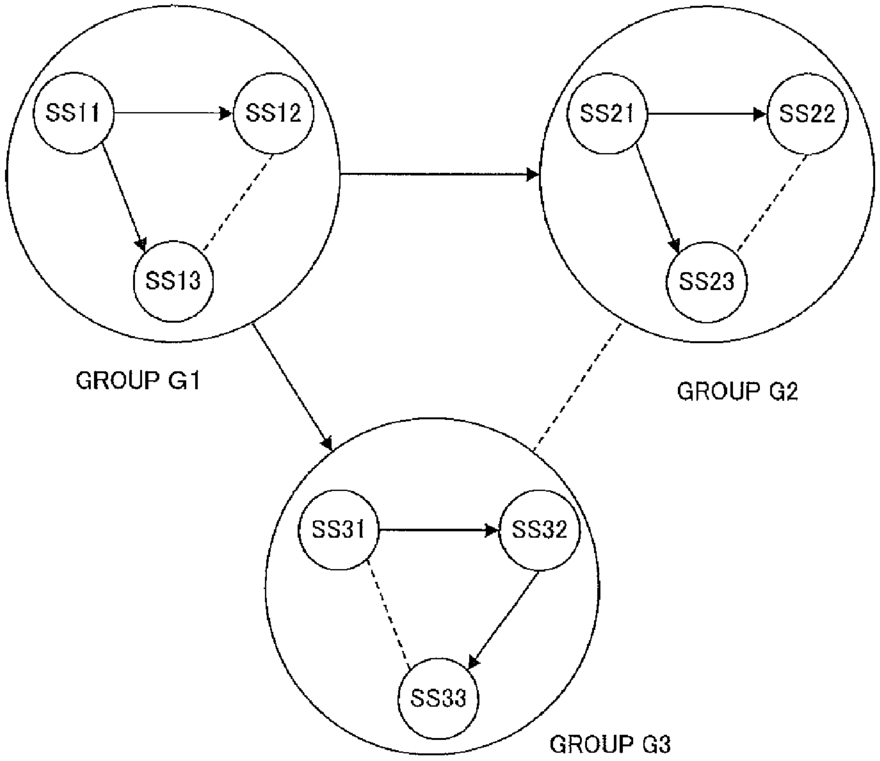
FIG. 11 is a diagram illustrating an example link model between data items and between groups built through a link-model building process.

FIG. 11 is a diagram illustrating example link models between the data items and between the groups built through the link-model building process. In FIG. 11, the continuous line interconnecting the data items or the groups indicates that there is a causal association therebetween and an arrow indicates a direction of cause and result. Moreover, the dashed line indicates that there is no causal association. In FIG. 11, only the link model for the transient condition is illustrated, but the same is true of the link model for the steady condition.

In the above-explained link-model building process, when the large number of data items have a mutual relationship therebetween, it is preferable that instead of the correlation coefficient, a partial correlation coefficient that excludes the effects of other variables (signal components, i.e., values of sensor data) should be applied. In order to avoid reaching a false causal association by calculating a partial correlation coefficient between minute noises during the process of eliminating the effects of other variables, it is preferable to calculate a change rate of the signal intensity before and after the process of eliminating the effects of other variables, and to take a product of the partial correlation coefficient and the signal intensity change rate as an index of a causal association.

In the case of this embodiment, the link-model building process takes a role as a preparation for an abnormality cause estimating process to be executed successively. Hence, in the link building process, not only the link model is simply built but also the link model built in the normal condition, i.e., in the normal operation is compared with the link model built when an abnormality is detected, and an abnormality difference link model is built.

Figure 12:
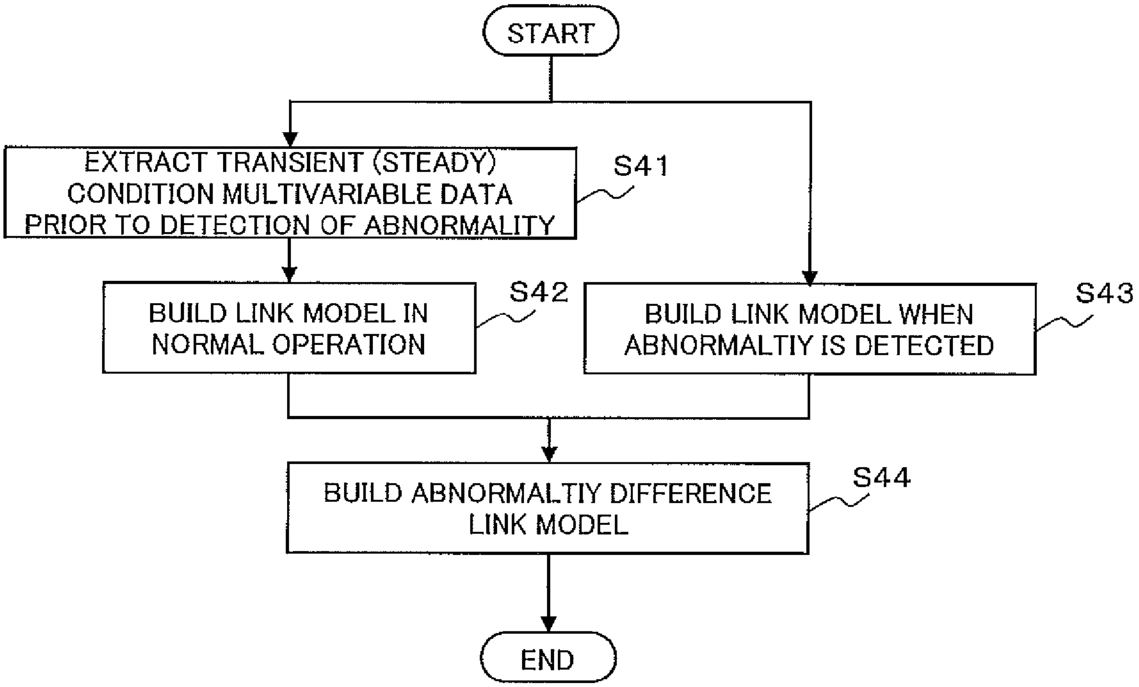
FIG. 12 is a diagram illustrating an example process flow of the link-model building process as a preparation for an abnormality cause estimating process.

FIG. 12 is a diagram illustrating an example process flow of the link-model building process as a preparation for the abnormality cause estimating process. As illustrated in FIG. 12, first, the CPU extracts the transient-condition multivariable data or the steady-condition multivariable data before a detection of an abnormality from the memory 5 (step S41). Next, the CPU builds the link model in the normal operation based on the transient-condition multivariable data or the steady-condition multivariable data (step S42). Conversely, at this time, the CPU builds the link model when an abnormality is detected based on the transient-condition multivariable data or the steady-condition multivariable data created by the transient-condition abnormality determining process unit 24 or the steady-condition abnormality determining process unit 25 (step S43). Next, the CPU takes a difference between the link model in the normal operation and the link model when an abnormality is detected, and builds an abnormality difference link model (step S44).

The above-explained process is executed for each condition mode and for each group. Moreover, when a model between the groups is built, time-series data of the inter-item average value of the pieces of time-series sensor data of the plurality of data items included in each group or time-series data of an inter-item major element value is applied.

Figure 13A:
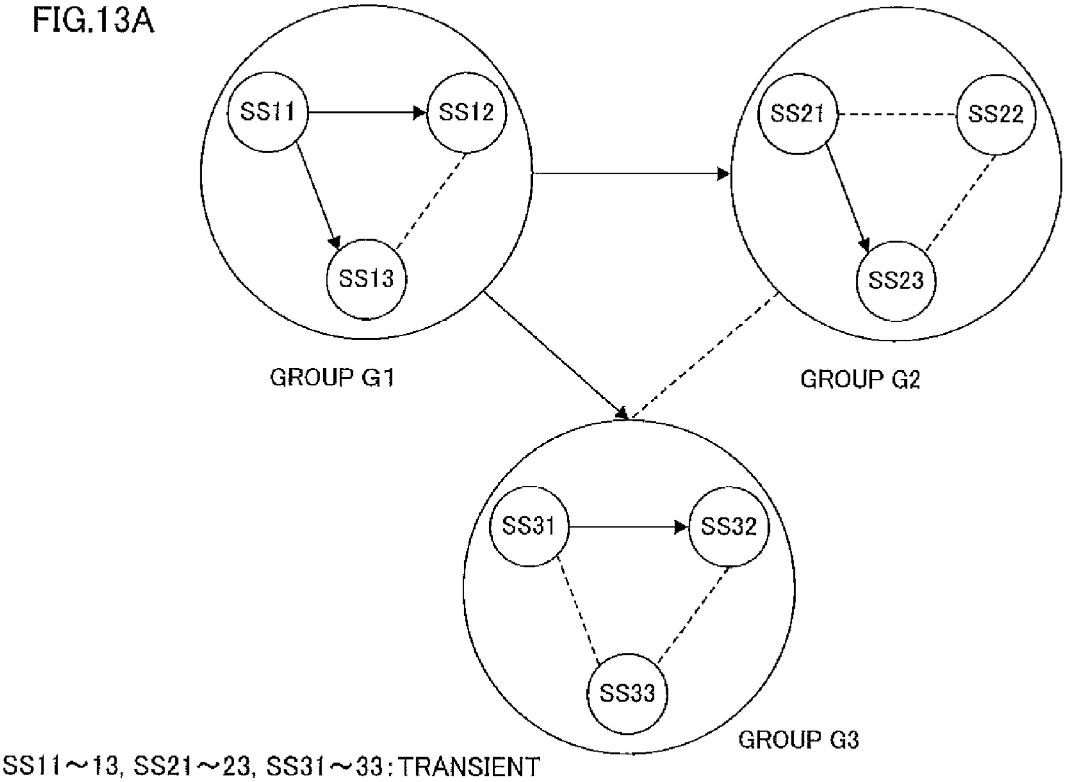
Figure 13B:
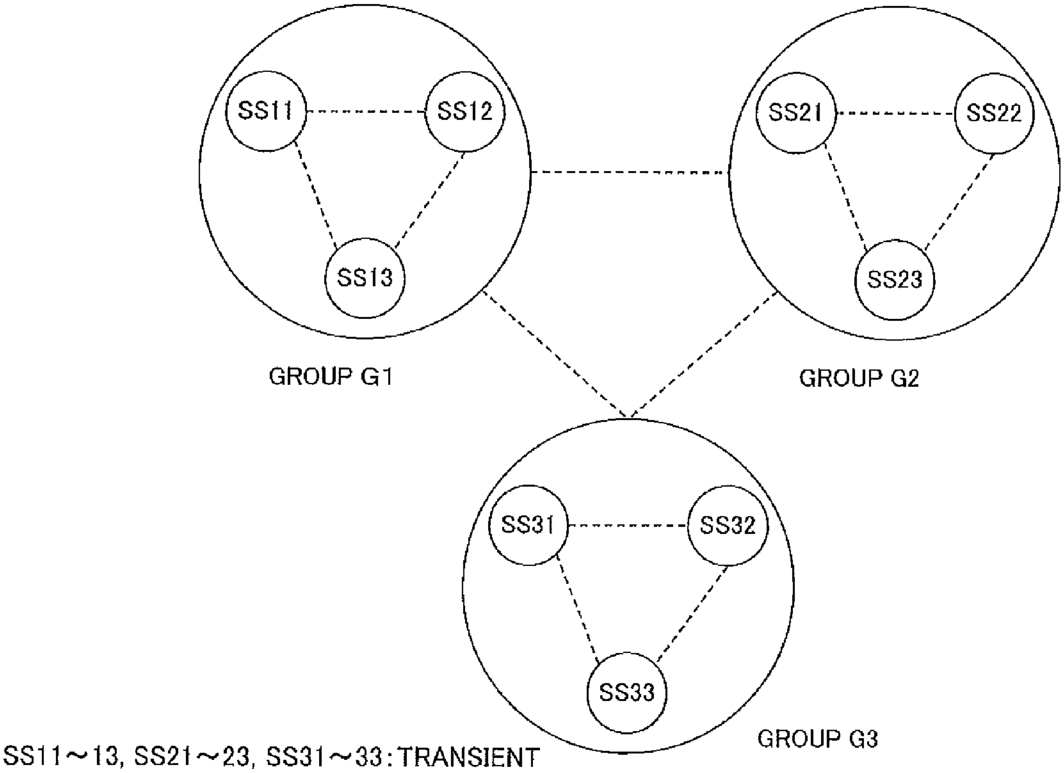

FIGS. 13A and 13B are diagrams illustrating an example abnormality difference link model built through the link model building process. FIG. 13A is an example abnormality difference link model in the transient condition, and FIG. 13B is an example abnormality difference link model in the steady condition. The abnormality difference link model is a difference between the link model in the abnormal condition and the link model in the normal condition, and thus an arrow interconnecting the data items or the groups represents a propagation route of an abnormality.

<Abnormality Cause Estimating Process>

The abnormality cause estimating process is a process by the abnormal cause estimation process unit 32, and is a process of estimating a cause of the abnormality based on the abnormality difference link model built through the link model building process. In FIGS. 13A and 13B, the arrow is information interconnecting a cause and a result, and thus the CPU traces the data item or the group at the upstream side of the arrow, thereby obtaining the source where the abnormality occurs.

In the case of the abnormality difference link model in the transient condition illustrated in FIG. 13A, the upstream side of the data item SS32 in the group G3 is the data item SS31. there is no upstream data item of the data item SS31, but the group G1 is the upstream group of the group G3. Hence, when the internal space of the group G1 is referred, the data item SS11 is present as the upstream of the data item SS12 and that of the data item SS13. At this time, there is no upstream of the data item SS11 and that of the group G1. Accordingly, it becomes clear that the data item SS11 of the group G1 is the cause of the abnormality. That is, it becomes clear that the fundamental cause of the abnormal behavior appeared in the sensor data in the transient condition with the data item of SS32 in the group G3 is the abnormality of the sensor data in the transient condition with the data item of SS11.

Conversely, the abnormality difference link model in the steady condition illustrated in FIG. 13B has no arrow indicating a causal association. This means that the same link model is built between the normal condition case and the abnormal condition case. Hence, this represents that no abnormality occurs in the steady condition.

The process of building a link model for each condition mode or for each group, and tracing the fundamental cause of an abnormality as explained above has a remarkable advantages in reducing the calculation amount and the calculation time.

As explained above, the abnormality monitoring-diagnosing device 100 causes the transient-condition abnormality determining process unit 24 or the steady-condition abnormality determining process unit 25 to detect an abnormality in the monitoring-target apparatus 8, and causes the abnormal cause estimation process unit 32 to obtain the fundamental cause (a defective part) of the abnormality. When, however, the scale of the monitoring-target apparatus 8 increases, and depending on the kind of the detected abnormality, the abnormal cause estimation process unit 32 may obtain a plurality of fundamental causes. In this case, the abnormal cause estimation process unit 32 presents the plurality of fundamental causes as the candidates of the fundamental cause (a defective part).

As explained above, the transient-condition abnormality determining process unit 24 or the steady-condition abnormality determining process unit 25 detects the abnormality of the monitoring-target apparatus 8, and when the fundamental cause is obtained, the monitoring-diagnosing information output process unit 4 causes the display unit 41 to display the obtained result. The abnormality difference link model at this time may be stored in an unillustrated diagnosis record DB, etc., as an abnormality case example, and the abnormality case example that has built the past same or similar abnormality difference link model may be searched and displayed together with supplemental information like the time of occurrence as needed.

<Advantages of Embodiment>

As explained above, according to the embodiment of the present invention, the abnormality monitoring-diagnosing device 100 detects a transition point of the condition mode (activation transient condition, operation steady condition, and deactivation transient condition) of the monitoring-target apparatus 8, and extracts the pieces of sensor data obtained from the sensors 81 for each condition mode to determine an abnormality. Accordingly, an appropriate abnormality determination criterion can be set for each condition mode. Moreover, the data item for identifying the sensor data is sorted into a group, and thus the appropriate abnormality determination criterion can be managed for each group. Hence, according to this embodiment, the precision of the abnormality determination can be improved, and the abnormality can be detected without being unfound in the initial stage at which the abnormality occurs. Since the determination criterion is appropriate and highly precise, a generation of a false report that determines the normal operation as an abnormality can be suppressed.

In the estimation of a defect cause successively carried out after the abnormality detection, the abnormality monitoring-diagnosing device 100 builds, from the pieces of sensor data of the data item condition mode by condition mode, the link model between the data items in the group for each group, and builds the link model between the groups relative to the representative data in each group. Hence, the abnormality cause of the data item where the abnormality is detected can be traced at fast speed, and the fundamental cause (defective part) can be diagnosed promptly.

<Applicable Apparatus>

In the above-explained embodiment, energy converting apparatuses represented by a cogeneration apparatus as the monitoring-target apparatus 8 have been presumed, but the apparatuses to which the present invention is applicable are not limited to the energy converting apparatuses like a cogeneration apparatus.

For example, the present invention is applicable to apparatuses that convert wind power or wave power into at least either one of kinetic energy or electric energy instead of a fuel combustion. In this case, the data items to be measured include at least some of a wind speed, a motion speed of a mechanical component, a vibration of the mechanical component, an acceleration of the mechanical component, a distortion of the mechanical component, a sound of the mechanical component, a worn level of the mechanical component, a constituent of a lubricant, a pressure of the lubricant, a temperature of the lubricant, a voltage of an electric component, a current of the electric component, a frequency of the electric component, a surrounding temperature, a surrounding humidity, a surrounding atmosphere pressure, a voltage of a power system, a current of the power system, an operated time of the apparatus, an operated time of a component, a kinetic output or a power output by an energy converting apparatus, and an energy conversion efficiency thereof, etc.

Moreover, the present invention is applicable to apparatuses that convert geothermal power into at least one of kinetic energy, thermal energy, or electric energy. In this case, the data items to be measured include at least some of a steam supply amount, a steam temperature, a steam pressure, a motion speed of a mechanical component, a vibration of the mechanical component, an acceleration of the mechanical component, a distortion of the mechanical component, a sound of the mechanical component, a worn level of the mechanical component, a constituent of a lubricant, a pressure of the lubricant, a temperature of the lubricant, a power of an electric component, a reactive power of the electric component, a voltage of the electric component, a current of the electric component, a frequency of the electric component, a surrounding temperature, a surrounding humidity, a surrounding atmosphere pressure, a voltage of a power system, a current of the power system, an operated time of an apparatus, an operated time of a component, a kinetic output, a thermal output, and a power output by an energy converting apparatus, and an energy conversion efficiency thereof, etc.

The present invention is applicable to motor apparatuses that convert electric energy into mechanical energy. An example motor apparatus is an ascending/descending apparatus represented by an elevator and an escalator, a plant apparatus represented by a pump and a compressor, or a machining apparatus represented by a turning machine, a drill press, a milling machine, and a grinding machine, etc. In this case, the data items to be measured include at least some of a motion speed of a mechanical component, a vibration of the mechanical component, an acceleration of the mechanical component, a distortion of the mechanical component, a sound of the mechanical component, a worn level of the mechanical component, a constituent of a lubricant, a pressure of the lubricant, a temperature of the lubricant, a power of an electric component, a reactive power of the electric component, a voltage of the electric component, a current of the electric component, a frequency of the electric component, a surrounding temperature, a surrounding humidity, a surrounding atmosphere pressure, an operated time of an apparatus, an operated time of a component, a work load of the mechanical component, a motion speed of the mechanical component, a vibration of the mechanical component, an acceleration of the mechanical component, a distortion of the mechanical component, a sound of the mechanical component, a worn level of the mechanical component, and an energy conversion efficiency, etc.

Furthermore, the present invention is applicable to semiconductor processing apparatuses that convert electric energy into mechanical energy or plasma energy. Example semiconductor apparatuses are a semiconductor CMP (Chemical Mechanical Polishing) apparatus, a semiconductor etching apparatus, and a semiconductor film forming apparatus. In this case, the data items to be measured include at least some of a worn level of a mechanical component, a power of an electric component, a reactive power of the electric component, a voltage of the electric component, a current of the electric component, a frequency of the electric component, an impedance of the electric component, a temperature of a semiconductor wafer, an environmental temperature in a processing chamber, an environmental pressure in the processing chamber, an environmental light emission in the process chamber, an operated time of an apparatus, an operated time of a component, a processed amount of semiconductors, an amount of film formation, a process uniformity in the surface of a semiconductor wafer, a formed film uniformity, and an energy conversion efficiency, etc.

DESCRIPTION OF REFERENCE NUMERALS

1 Sensor-data collecting process unit (first process unit)
2 Abnormality monitoring process unit (second process unit)
3 Causal diagnosis process unit (third process unit)
4 Monitoring-diagnosing information output process unit
5 Memory
6 Maintenance support device
7 Communication network
8 Monitoring-target apparatus
11 Sensor data DB
21 Condition-mode transition point detecting process unit
22 Condition-mode-by-condition-mode sensor data extracting process unit
23 Data-item group sorting process unit
24 Transient-condition abnormality determining process unit
25 Steady-condition abnormality determining process unit
31 Link-model building process unit
32 Abnormal cause estimation process unit
41 Display unit
42 Abnormality-detected initial operation manager
51 Condition-mode transition point DB
52 Condition-mode-by-condition-mode sensor data storing unit
53 Group-sorting-data storing unit
54 Transient-condition multivariable data storing unit
55 Steady-condition multivariable data storing unit
61 Display unit
62 Maintenance worker
81 Sensor
82 BOM
83 Dendrogram
84 Cluster hierarchy threshold
85 Divided dendrogram
91 Dead time delay
92 Dead time delay abnormality
93 Transient fluctuation abnormality
100 Abnormality monitoring-diagnosing device (monitoring diagnostic 15 device)

The invention claimed is:

1. A monitoring diagnostic device comprising:

a first process unit that collects, from a monitoring-target apparatus having a plurality of components each having a normal operation behavior, a time-series physical quantity indicating a time transition in a physical condition of each of the plurality of components;

a second process unit that detects an abnormality in the monitoring-target apparatus using the time-series physical quantities of the plurality of components collected by the first process unit, the abnormality indicating at least one of the plurality of components is behaving differently from the normal operation behavior; and a third process unit that diagnoses a cause of the abnormality, the second process unit being configured to execute:

a data-item group sorting process of sorting data items identifying the time-series physical quantities of the plurality of components into a plurality of groups; and an abnormality determining process of determining a group abnormality for each sorted group based on the time-series physical quantity of the component identified by the data item belonging to that group and statistical data on the time-series physical quantity of the component, the group abnormality indicating the component for a respective group is behaving differently from the normal operation behavior; and the third process unit being configured to execute:

a link-model building process of building, for each sorted group, a link model including an inter-data-item link model representing a dependency relation between the time-series physical quantities of the components identified by the data item belonging to that group, and an inter-group link model representing a dependency relation between representative values of the groups; and an abnormality cause estimating process of estimating a cause of the abnoi orality based on a difference link model between a link model built based on the time-series physical quantity of the component before the abnormality is detected through the abnormality determining process and a link model built based on the time-series physical quantity of the component when the abnormality is detected through the abnormality determining process.

2. The monitoring diagnostic device according to claim 1, wherein the second process unit further executes:

a condition-mode transition point detecting process of detecting, for each time-series physical quantity of each of the plurality of components, a transition point of a condition mode of that time-series physical quantity; and a condition-mode-by-condition-mode time-series physical quantity extracting process of dividing the time-series physical quantity of the component by each condition mode based on the detected transition point, and of extracting each divided time-series physical quantity of the component as a time-series physical quantity in a condition mode by condition mode manner, and executes the link-model building process and the abnormality determining process on each time-series physical quantity in a condition mode by condition mode manner extracted through the condition-mode-by-condition-mode time-series physical quantity extracting process, and the third process unit executes the link-model building process and the abnormality cause estimating process on each time-series physical quantity in a condition mode by condition mode manner extracted through the condition-mode-by-condition-mode time-series physical quantity extracting process.

3. The monitoring diagnostic device according to claim 2, wherein the condition mode distinguished through the condition-mode transition point detecting process is a transient condition during an activation and during a deactivation, and a steady condition during an operation.

4. The monitoring diagnostic device according to claim 1, wherein in the link-model building process, a presence/absence of a dependency relation between the two data items or the two groups is determined based on the two time-series physical quantities specified by respective data items or a partial correlation coefficient of two representative values of respective groups.

5. A monitoring diagnostic method executed by a monitoring diagnostic device, the method comprising:

collecting, via a first process unit and from a monitoring-target apparatus having a plurality of components each having a normal operation behavior, a time-series physical quantity indicating a time transition in a physical condition of each of the plurality of components;

detecting, via a second process unit, an abnormality in the monitoring-target apparatus using the time-series physical quantities of the plurality of components collected by the first process unit, the abnormality indicating at least one of the plurality of components is behaving differently from the normal operation behavior; and diagnosing, via a third process unit, a cause of the abnormality; wherein the second process unit being configured to execute:

a data-item group sorting process of sorting data items identifying the time-series physical quantities of the plurality of components into a plurality of groups; and an abnormality determining process of determining a group abnormality for each sorted group based on the time-series physical quantity of the component identified by the data item belonging to that group and statistical data on the time-series physical quantity of the component, the group abnormality indicating the component for a respective group is behaving differently from the normal operation behavior; and the third process unit being configured to execute:

a link-model building process of building, for each sorted group, a link model including an inter-data-item link model representing a dependency relation between the time-series physical quantities of the components identified by the data item belonging to that group, and an inter-group link model representing a dependency relation between representative values of the groups; and an abnormality cause estimating process of estimating a cause of the abnormality based on a difference link model between a link model built based on the time-series physical quantity of the component before the abnormality is detected through the abnormality determining process and a link model built based on the time-series physical quantity of the component when the abnormality is detected through the abnormality determining process.

6. The monitoring diagnostic method according to claim 5, wherein the second process unit further executes:

a condition-mode transition point detecting process of detecting, for each time-series physical quantity of each of the plurality of components, a transition point of a condition mode of that time-series physical quantity; and a condition-mode-by-condition-mode time-series physical quantity extracting process of dividing the time-series physical quantity of the component by each condition mode based on the detected transition point, and of extracting each divided time-series physical quantity of the component as a time-series physical quantity in a condition mode by condition mode manner, and executes the link-model building process and the abnormality determining process on each time-series physical quantity in a condition mode by condition mode manner extracted through the condition-mode-by-condition-mode time-series physical quantity extracting process, and the third process unit executes the link-model building process and the abnormality cause estimating process on each time-series physical quantity in a condition mode by condition mode manner extracted through the condition-mode-by-condition-mode time-series physical quantity extracting process.

7. The monitoring diagnostic method according to claim 6, wherein the condition mode distinguished through the condition-mode transition point detecting process is a transient condition during an activation and during a deactivation, and a steady condition during an operation.

8. The monitoring diagnostic method according to claim 5, wherein in the link-model building process, a presence/absence of a dependency relation between the two data items or the two groups is determined based on the two time-series physical quantities specified by respective data items or a partial correlation coefficient of two representative values of respective groups.

* * * * *